United States Patent Office 2,799,080
Patented July 16, 1957

2,799,080

BEARINGS AND BEARING MATERIALS AND METHOD OF MAKING SAME

Walter Eric Duckworth, Wembley, England, assignor to The Glacier Metal Company Limited, Alperton, England, a company of Great Britain No Drawing. Application June 13, 1955,
Serial No. 515,128

Claims priority, application Great Britain June 28, 1954

10 Claims. (Cl. 29—182.3)

This invention relates to bearings, bearing layers and materials for making bearings of the kind in which the bearing or bearing layer comprises a matrix of a relatively hard metal or alloy in which is dispersed lead or a lead alloy, and aims, amongst other things at facilitating the manufacture of bearings and bearing layers or of materials for making bearings of this kind and at enabling bearings to be produced which will meet satisfactorily both technical and commercial requirements.

Bearings according to the invention may be in the form of simple bearing elements such as bushes or half bushes or may be of the composite type consisting of a backing, usually of steel, to which is applied a layer of bearing material bonded to the backing and with or without an overlay or lining of soft metal applied to said layer and usually having a thickness of between 0.0002 and 0.007 inch.

According to the present invention a material for use in the manufacture of a bearing of the kind referred to, or a bearing or bearing layer of the kind referred to itself is produced by combining iron or an iron alloy and lead or a lead alloy in proportions containing between 10% and 50% of lead, and with the inclusion of a proportion of sulphur.

Since in bearings, bearing layers or bearing materials according to the invention the iron and/or the lead may be substantially pure or in the form of an alloy of the metal mentioned, the terms "iron" and "lead" will, for convenience, herein be employed to include suitable alloys of each of such metals and are to be so interpreted except where the context otherwise requires.

Bearings or bearing layers according to the invention may, in a preferred method, be formed by sintering a mixture of iron and lead powders including the appropriate proportion of sulphur or, in the case of a bearing comprising a bearing layer bonded to a backing, by applying to the backing either by sintering or by spraying or by electroplating a porous iron layer and impregnating this layer with lead in a molten bath of lead containing the appropriate proportion of sulphur.

Alternatively an iron-lead-sulphur bearing material according to the invention may be produced and then be formed into bearings or bearing layers according to the invention by casting, or by converting the bearing material into fine powder, for example by a conventional method such as atomization or grinding, and then forming the powder into a bearing or bearing layer by sintering. Again, a bearing material according to the invention may be produced and then formed into a bearing layer by spraying the molten material on to a suitable backing, as by means of a known form of spray gun.

In any case the sulphur is preferably present during the production of an iron-lead-sulphur bearing material, bearing or bearing layer according to the invention, in the form of a sulphide, in which case the sulphide present may be partly or wholly a sulphide of iron and/or of lead or may be partly or wholly a sulphide of some other metal which combines with the iron-lead to provide an improved structure.

From the above description it will be understood that there is included within the scope of the invention (1) an iron-lead-sulphur alloy in the form of a powder from which bearings or bearing layers according to the invention may be produced by sintering (2) an iron-lead-sulphur alloy for casting into bearings or bearing layers or spraying into bearing layers according to the invention, and (3) bearings formed of or including a layer formed of such a bearing material whether such bearings or the appropriate layers thereof are produced in one of the ways indicate above from material according to the invention already made, or the iron, lead and sulphur are combined during the actual making of the bearings or bearing layers.

One of the most important applications of the invention is envisaged as being in the manufacture of composite bearings consisting of a backing, usually of steel, to which is bonded a layer (hereinafter called for convenience the interlayer) of material according to the invention and usually, but not necessarily having a further layer (hereinafter for convenience called the lining) of a soft metal such as lead, tin, cadmium or an alloy of one of such metals, applied to the interlayer; and an example of the invention as applied to the making of one form of such a bearing, or of a composite material from which such bearings can be made, will now be given.

In this example a composite bearing or bearing material is made by applying to a steel backing, preferably previously copper plated, a layer of either an already made iron-lead-sulphur powder according to the invention or a mixture of iron and lead powders containing the appropriate proportion of sulphur, and then forming the layer and bonding it to the backing by sintering, the sulphur being present in the latter case either solely in the form of a sulphide of iron and/or of lead or partly or wholly in the form of a sulphide of a metal which combines with at least one of these metals to assist in the production of a satisfactory interlayer. For example the sulphide may be present in the form of iron sulphide, and/or lead sulphide and/or a sulphide of copper, nickel or tin. Where iron, copper or nickel sulphide is used this may be present in proportions up to 10% but approximately 6% is preferred, while where tin sulphide is used this should not be present in quantities exceeding 1%.

Thus it has been found that the addition of sulphur, preferably in the form of a metallic sulphide to iron-lead in the formation of an interlayer in the making of such a composite bearing or bearing material greatly improves the ease of sintering and the readiness with which the interlayer adheres to a steel backing. This is considered to be due to the fact that the presence of sulphur in the iron lead system increases the mutual solubility of the iron and lead at the sintering temperature and thus decreases the contact angle. For example in an untreated 70% iron 30% lead alloy, no iron is found in the lead and no lead in the iron after sintering, but when iron sulphide or lead sulphide or free sulphur is added to the iron lead such that the final composition is 65% iron 30% lead 5% sulphur the iron matrix is found to contain 3% lead and 6% sulphur after sintering, the mutual solubility of the iron and lead having been increased and sintering greatly facilitated.

In addition the contact angle in an untreated iron lead alloy is greater than 90° but when 10 parts per 100 of iron sulphide or lead sulphide is included in the iron lead composition the contact angle is considerably below 90° and again sintering is facilitated.

While in the above example, as mentioned, the sulphide may be included partly or wholly as iron sulphide or as lead sulphide, iron sulphide is preferred.

Examples of suitable compositions for the formation by sintering of the interlayer of a composite bearing or bearing material according to the invention in the manner mentioned above, and suitable also for the formation of simple bearings according to the invention, such as bushes, by sintering are as follows:

Example 1.—65% iron, 30% lead, 5% iron-sulphide
Example 2.—70% iron, 25% lead, 5% lead-sulphide
Example 3.—68% iron, 30% lead, 2% nickel-sulphide Should a greater proportion of sulphur to nickel be required than in Example 3 above, then in an otherwise similar example further sulphur could be included in the form of either lead-sulphide or iron-sulphide, a typical composition being:

Example 4.—65% iron, 30%, 2% nickel-sulphide, 3% iron sulphide.

Moreover, although in the above examples the sintering would be effected with mixed iron and lead powders, if sufficient sulphide be included in iron-lead in the molten state, the immiscibility of the iron and lead in the molten state is sufficiently reduced to make possible the manufacture of a pre-alloyed iron-lead-sulphur powder from which a simple sintered bearing or the interlayer of a composite bearing or bearing material with a much smaller grain size than hitherto can be produced.

Although in the examples given mono-sulphides e. g. FeS or PbS are used, it is to be understood that other sulphides, for example $Fe_2S_3$, $FeS_2$ etc. may be used when available and convenient.

Moreover although in the examples quoted above the proportion of lead in the interlayer lies between 25% and 30% since this is in many cases a preferred composition, it will be understood, that larger or smaller proportions of lead may be present; although care must be taken not to make the total combined lead and sulphur content too high, since the iron content may then be insufficient to ensure a continuous hard metal matrix.

Again, while the inclusion of the sulphur as a sulphide or sulphides in a bearing or interlayer formed by sintering has been particularly referred to above, the sulphur may in some cases be included in the form of free sulphur. In this case, however, since the sintering temperature will be much above the boiling point of free sulphur there is risk of escape of the sulphur from the interlayer during sintering and therefore contamination of the sintering furnace atmosphere. Nevertheless small amounts of free sulphur can be included successfully although with amounts above 5% the risk of loss by vapourization is high.

When, in composite bearings or bearing materials according to the invention a lining is provided as will usually be the case, this may either be of lead or lead alloy or of some other suitable soft metal for example of tin or cadmium or an alloy of one of them. Moreover when the lining is of lead it may be of the same composition as the lead of the interlayer or of a different composition. The lining may for example include tin, indium or thallium and in this case the composition of the interlayer may be such that diffusion of these metals from the lining into the interlayer tends to be resisted or a so called barrier layer, for example of nickel, may be provided between the interlayer and the lining to prevent such diffusion.

Alternatively, where the lining includes tin, indium or thallium, diffusion into the lead of the interlayer may be resisted or prevented by including therein an appropriate proportion of the metal of which diffusion is to be resisted. This may be effected either in the making of the interlayer or by initially including excess tin, indium or thallium in the lining and diffusing a proportion thereof into the interlayer by heat treatment. In another example excess tin, indium or thallium may be provided in the lead of the interlayer and the lining be applied as substantially pure metal into which tin, indium or thallium is subsequently diffused from the interlayer by heat treatment.

The invention is applicable to bearings and bearing materials of the composite type referred to having a soft metal lining in which the thicknesses of the lining and interlayer and the relationship between such thicknesses vary widely, including bearings and bearing materials in accordance with the invention described in the specification of British patent application No. 34,074 of 1953, that is to say bearings and bearing materials of the composite tri-metal type in which the thickness of the lining is between 0.0002 inch and 0.007 inch and the thickness of the interlayer is between 0.002 inch and 0.007 inch.

What I claim as my invention and desire to secure by Letters Patent is:

1. A bearing material consisting essentially of a matrix of iron in which is dispersed lead in a proportion of from 10% to 50% and a sulfide of a metal of the group consisting of iron, lead, nickel, copper and tin in a proportion of from 0.5% to 10%.

2. A bearing material as defined in claim 1 having the composition 65% of iron, 30% of lead and 5% of iron sulfide.

3. A bearing material as defined in claim 1 having the composition 70% of iron, 25% of lead and 5% of lead sulfide.

4. A bearing material as defined in claim 1 having the composition 68% of iron, 30% of lead and 2% of nickel sulfide.

5. A bearing material as defined in claim 1 having the composition 65% of iron, 30% of lead, 2% of nickel sulfide and 3% of iron sulfide.

6. A bearing material as defined in claim 1 in which the metal sulfide is tin sulfide in the proportion of from 0.5% to 1%.

7. A bearing material as defined in claim 1 in which the metal sulfide is a sulfide of a metal of the group consisting of iron, lead, copper and nickel in the proportion of about 6%.

8. A method of making bearing material which comprises sintering together a mixture of iron with 10% to 50% of lead and from 0.5% to 10% of a sulfide of a metal of the group consisting of iron, nickel, lead, copper and tin in the form of powders thereof.

9. A tri metal bearing comprising a steel backing, an interlayer bonded to said backing, said interlayer consisting essentially of an iron matrix containing dispersed therein from 10% to 50% of lead and from 0.5% to 10% of a sulfide of a metal of the group consisting of iron, lead, nickel, copper and tin, a lining of a relatively soft metal attached to said interlayer.

10. A composition adapted for the production of a bearing material by sintering consisting essentially of a mixture of iron, from 10% to 50% of lead and from 0.5% to 10% of a sulfide of a metal of the group consisting of iron, lead, nickel, copper and tin in powdered form.

References Cited in the file of this patent

UNITED STATES PATENTS 228,615     Dick et al. _____ June 8, 1880